United States Patent [19]

Clem

[11] Patent Number: 4,869,132
[45] Date of Patent: Sep. 26, 1989

[54] AUTOMATED ELECTRICAL SWITCHING SYSTEM

[76] Inventor: Michael L. Clem, 1025 W. Colebrook, Santa Maria, Calif. 93454

[21] Appl. No.: 74,782

[22] Filed: Jul. 17, 1987

[51] Int. Cl.$^4$ .............................................. B60K 41/06
[52] U.S. Cl. ........................................ 74/858; 74/860
[58] Field of Search ................ 74/856, 857, 858, 859, 74/860; 123/1 A, 559.1, 602, 660, 665

[56] References Cited

U.S. PATENT DOCUMENTS

| | | | |
|---|---|---|---|
| 2,657,776 | 11/1953 | Parker | 192/0.062 |
| 3,712,156 | 1/1973 | Kuhnle | 74/858 |
| 3,810,532 | 5/1974 | Schuppel | 192/0.062 |
| 3,939,738 | 2/1976 | Adey et al. | 74/859 |
| 4,026,168 | 5/1977 | Kobayashi | 74/857 X |
| 4,120,214 | 10/1978 | Toda et al. | 74/859 X |
| 4,245,604 | 1/1981 | Lahiff | 74/860 X |
| 4,280,469 | 7/1981 | Ganoung | 123/568 |
| 4,346,625 | 8/1982 | Latsch et al. | 74/860 X |
| 4,373,485 | 2/1983 | Hayashi | 74/860 X |
| 4,510,912 | 4/1985 | Gamble | 123/525 |
| 4,546,732 | 10/1985 | Mae et al. | 123/A 1 |
| 4,572,140 | 2/1986 | Wheatley | 123/541 |
| 4,713,763 | 12/1987 | Hofmann | 74/860 X |

FOREIGN PATENT DOCUMENTS

| | | | |
|---|---|---|---|
| 61-119436 | 6/1986 | Japan | 74/856 |
| 2151727 | 7/1985 | United Kingdom | 74/858 |

*Primary Examiner*—Dwight G. Diehl
*Attorney, Agent, or Firm*—Foley & Lardner, Schwartz, Jeffery, Schwaab, Mack, Blumenthal & Evans

[57] ABSTRACT

The nitrous oxide control system of the present invention enables the user to select certain gear ratios in which the nitrous oxide delivery system is enabled and certain gears in which the nitrous oxide delivery system is disabled. The control system also cuts out the delivery system when shifting between gears and provides the user with the full capability to turn off the delivery system at any time.

5 Claims, 5 Drawing Sheets

AUTOMATED ELECTRICAL SWITCHING SYSTEM

BACKGROUND OF THE INVENTION

The present invention relates to control systems for motors and in particular to a system which controls the power generated by an internal combustion engine during selected gear ratios of a transmission connected to the engine.

During the course of a race, it is sometimes useful to have a sudden burst of power. For example, during the final stretch of a road race or when passing another vehicle at a critical time it is helpful to have a short duration power burst. Further, during drag racing, it may be desirable to have full power applied during the entire race or when the vehicle is in selected gears.

Various systems for chemical supercharging of an engine have been proposed and used for some time. One type of such supercharging is accomplished with nitrous oxide which is a chemical compound of nitrogen and oxygen commonly known as an oxidizer. When under sufficient pressure, nitrous oxide is in a liquid form and when exposed to the heat of combustion in the engine it disassociates into its free elements of oxygen and nitrogen and creates a lean condition in the combustion chamber. Additional fuel is injected into the engine simultaneously with the nitrous oxide to provide a burst of power.

A conventional nitrous oxide system is shown in U.S. Pat. No. 4,572,140 to Wheatley. The Wheatley system comprises a cylinder or container holding a supply of liquid nitrous oxide under a pressure of, for example 900 psi. The nitrous oxide cylinder is connected by a conduit or supply line to the carburetor of the engine and has a solenoid actuated valve in the conduit for controlling the flow of the liquid nitrous oxide. The solenoid valve is operated by the driver from within the vehicle when the sudden burst of power is desired.

The Wheatley system and systems like it can be used in drag racing. However, in drag racing, the nitrous oxide may be applied when coming off the line and maintained active until the race is completed. Depending on the track condition, it may be desirable to deactivate the nitrous system for short periods, such as while running in certain gear ratios. With the Wheatley system, the nitrous oxide would be activated by depressing a switch in the passenger compartment and releasing the switch when the system is to deactivated. However, during the excitement of a race, a driver may forget to release the activation switch and overpower his vehicle leading to engine damage.

SUMMARY OF THE INVENTION

One object of the present invention is to provide a control system for controlling power generated by an internal combustion engine which is versatile and can be set to operate intermittently during the course of a race.

Another object of the present invention is to provide a control system for controlling power generated by an internal combustion engine which can easily be used with existing nitrous oxide delivery systems, turbochargers, superchargers, fuel injection systems and the like.

A further object of the present invention is to provide a control system for controlling the power generated by an internal combustion engine which is simple to install and use yet is highly effective in use.

Yet another object of the present invention is to provide a control system for controlling the power generated by an internal combustion engine which can be adapted for use with many different manual transmissions.

In accordance with the above and other objects, the present invention includes a control system which may be used with, for example, a nitrous oxide supply system comprising a source of nitrous oxide, a supply conduit for delivering the nitrous oxide to an intake manifold of an engine and a valve in the supply conduit. The control system comprises a sensor for sensing a gear ratio position of a transmission connected to the engine and a device for opening and closing the valve of the nitrous oxide system in dependence on the sensed gear ratio position.

The sensor may comprise switches for sensing positions of shift levers on the transmission. A separate switch may be associated with each gear position.

The opening and closing device may comprise a plurality of manually actuable switches connected to the switches for sensing positions of the shift levers. The manually actuable switches are associated, respectively, with the gear ratios of the transmission and are individually actuable to cause actuation of the valve during operation in the associated gear ratio. The opening and closing device may further include a master switch connected to the manually actuable switches to provide power thereto such that, as long as the master switch is actuated, the valve is actuated during operation in the gear ratios associated with the actuated manually actuable switches.

BRIEF DESCRIPTION OF THE DRAWINGS

The foregoing and other objects of the present invention will become more readily apparent as the invention becomes more fully understood from the detailed description set forth below, reference being had to the accompanying drawings in which like reference numerals represent like parts throughout and in which.

DETAILED DESCRIPTION OF THE PREFERRED EMBODIMENTS

The present invention will now be described with reference to a vehicle having a manual transmission with four forward gears, it being understood that the system of the invention can be used with transmissions having different numbers of gears as well.

Figure 1:
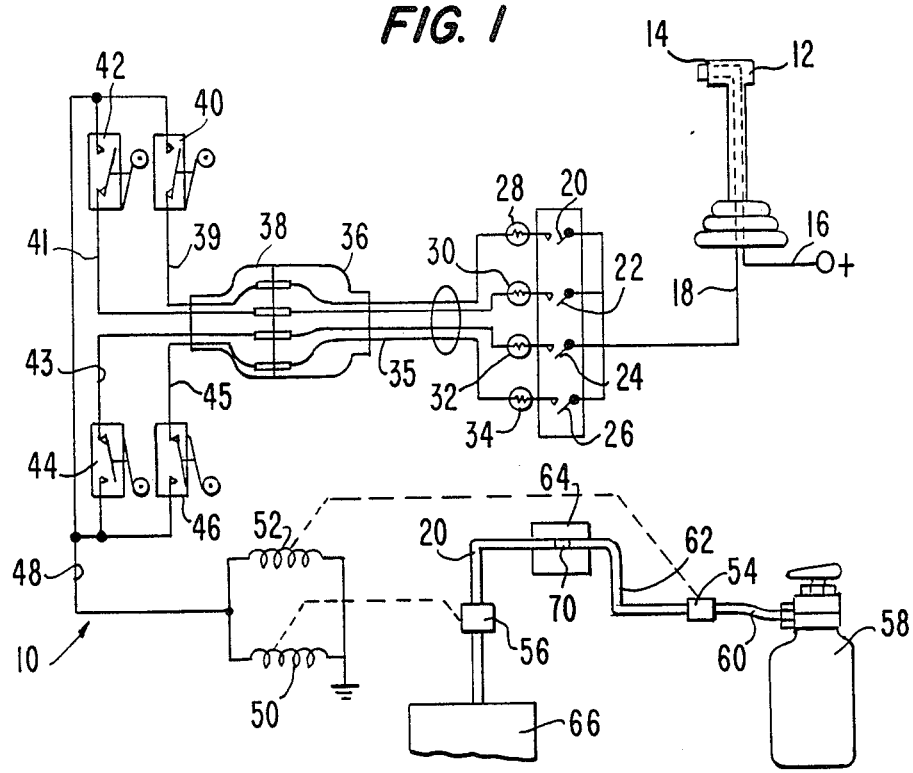
FIG. 1 is a schematic view of the control system of the present invention used with a nitrous oxide supply system.

FIG. 1 shows the overall layout of the control system 10 of the present invention used with a nitrous oxide delivery system. The system 10 is used with a vehicle having a gear shift lever 12. As is conventional, the gear shift lever 12 is located in a passenger compartment and is used to manually shift the transmission from one gear ratio to another.

A master control switch 14 is mounted on the shift lever 12 so that it can easily be reached by an operator of the vehicle. Switch 14 is a momentary contact switch which must be constantly depressed in order to be closed. A source of positive voltage is supplied to the switch 14 through a supply line 16. When the switch 14 is depressed, this positive voltage is passed to a line 18. It should be understood that switch 14 must be held down by the operator in order to supply voltage to the line 18. As soon as the switch 14 is released, no voltage is supplied to line 18.

Line 18 feeds four switches 20, 22, 24, and 26. These switches are toggle switches or the like of the single pole, double throw variety. There is one switch associated with each gear ratio position of the transmission. The switches 20, 22, 24 and 26 are located in the passenger compartment of the vehicle and are actuated by the driver to indicate the gear ratio positions in which operation of the nitrous oxide injection system is desired. That is, according to the present invention, the driver of the vehicle can manually set the nitrous oxide control system 10 to cause the nitrous oxide to be supplied only during operation of the vehicle in certain gear ratios by actuating the switches 20, 22, 24 or 26 associated with the desired gear ratios.

Lights 28, 30, 32 and 34 are connected in series, respectively, with the switches 20, 22, 24 and 26. The appropriate light 28, 30, 32 or 34 will be illuminated when the nitrous oxide system is actuated, as will become apparent below.

The leads from the lights are connected in a cable 35 and enter a connecter part 36. A second connector part 38 attaches to connector part 36 and contains the leads 39, 41, 43 and 45 which connect the lights 28, 30, 32 and 34, respectively, in series with roller switches 40, 42, 44 and 46. Switches 40, 42, 44 and 46 are gear ratio sensing switches and are mounted on the transmission itself to sense the gear ratio in which the transmission is operating, as will be discussed in greater detail below. Switch 40 is actuated if the transmission is in first gear, switch 42 is actuated if the transmission is in second gear, switch 44 is actuated if the transmission is in third gear, and switch 46 is actuated if the transmission is in fourth gear.

The output side of each of the transmission gear ratio sensing switches is connected through a line 48 to one side of each of a pair of solenoid coils 50 and 52 which are connected in parallel. The other side of each solenoid coil is connected to ground.

Solenoid coils 50 and 52 operate the nitrous oxide delivery system. Such delivery systems are well known. One delivery system will be discussed in general here. However, it should be understood that the present invention is amenable for use with virtually any such delivery system, such as that shown in U.S. Pat. No. 4,572,140 to Wheatley, the disclosure of which is incorporated herein by reference and which should be referred to for the details of a typical nitrous oxide supply system.

The nitrous oxide delivery system includes two solenoid operated valves 54 and 56 which are actuated, respectively, by the solenoid coils 52 and 50. The valve 54 is a feed valve from a nitrous oxide storage tank 58. A supply line 60 leads to the valve 54 and a supply line 62 leads from the valve 54 to intake manifold 64 of the vehicle engine.

The valve 56 is a fuel supply valve and controls the flow of fuel from a fuel storage tank 66. A fuel supply line 68 leads from the tank 66 to the valve 56 and a supply line 70 leads from the valve 56 to the manifold 64.

The fuel and the nitrous oxide combine in a jet 70 in the manifold and enter the engine as a fine homogenous mist.

As will understood from FIG. 1, before a race, the appropriate switches 20, 22, 24 and 26 are set to select the gear ratios in which the nitrous oxide system is to be operable. As soon as the race is started, the switch 14 on the shifting lever is actuated. The nitrous oxide system, however, is not started until the transmission is placed in the gears selected by the switches 20, 22, 24 and 26.

If, for example, first gear has been selected by closing switch 20, the nitrous oxide system will be actuated as soon as the transmission is placed in first gear as indicated by the closing of switch 40. The closing of switch 40 causes current to flow from the positive source through switch 14, through switch 20, through switch 40 and through the coils 50 and 52 to open valves 54 and 56. This supplies fuel and nitrous oxide to the manifold to give a power boost to the engine.

If two consecutive gears are selected, such as first and second gears by closing switches 20 and 22, it will be noted that the nitrous oxide system will be actuated by placing the transmission in first gear and will be disabled when the transmission is shifted from first to second gear and then is reactuated when the transmission is placed in second gear. That is, the control system of the present invention ensures that the nitrous system is disabled each time the transmission is shifted from one gear to the next regardless of the number of switches 20, 22, 24 and 26 which are closed. This protects the transmission from potentially damaging surges of power caused by applying a load shock to the transmission when releasing the clutch when a new gear is entered. That is, if the driver keeps the accelerator depressed during shifting and the nitrous oxide system is on, the engine power output is very high. If this full power is suddenly applied to the transmission, damage to the transmission may result. By disabling the nitrous oxide system during shifting, this hazard is avoided.

At any time during the race, the nitrous oxide system can be disabled by simply releasing the switch 14. Thus, in the case of wheel spin or other adverse conditions, the driver can merely release the switch 14 and run the vehicle at normal power levels. In this manner, the driver is still fully capable of turning the nitrous oxide system off whenever desired.

Figure 2:
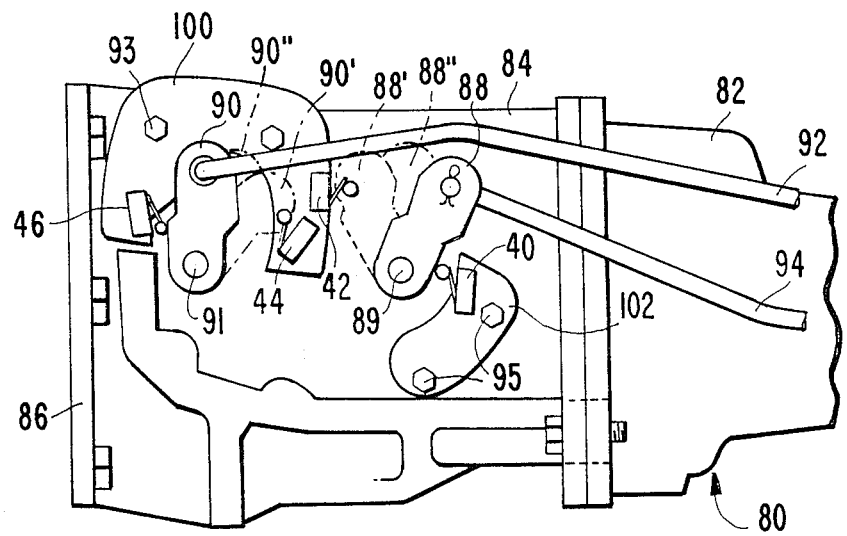
FIG. 2 is a side elevation view of a transmission showing the position of the gear selection sensing switches of the present invention.

FIG. 2 shows the attachment of the gear ratio sensing switches to the transmission 80. It will be seen in FIG. 2 that the transmission 80 is conventional and comprises a transmission housing consisting of two parts 82 and 84 bolted together in a conventional manner. The forward portion of the transmission housing includes a mounting flange 86 for connection to the bell housing. The transmission also includes two shifting levers 88 and 90. The shifting levers 88 and 90 are connected to shifting linkages (94) and (92), respectively, which are controlled by the driver controlled shift lever 12 in a conventional manner.

Attached to the conventional transmission are two mounting plates 100 and 102. Plate 100 has the shape of an inverted U and is bolted to the transmission hosing 84 by bolts 93 so as to extend along two sides of the shifting lever 90. Plate 102 is bolted to the transmission along one side of the shifting lever 88 using bolts 95.

The shifting lever 88 pivots around a pivot axis 89 and occupies the position indicated by 88 when the transmission is in first gear. When the transmission is in second gear, the lever 88 occupies the position indicated by 88'. Otherwise, the lever 88 occupies the position indicated by 88". First gear sensing switch 40 is mounted on plate 102 so that it occupies a position in which it is closed by contact with the shifting lever 88 when the lever is in position 88. When lever 88 is in positions 88' or 88", the switch 40 is open.

Lever 90 pivots around pivot axis 91 and occupies the position indicated by 90 when the transmission is in third gear. When the transmission is in fourth gear, the lever 90 occupies position 90'. Otherwise, the lever 90 occupies position 90".

Plate 100 mounts gear ratio sensing switches 42, 44 and 46. Switch 42 is mounted so that it is actuated by the lever 88 when in the second gear position 88'. Switch 44 is mounted so that it is actuated by lever 90 in position 90 so that switch 44 is closed and switch 46 is open. Finally switch 46 is actuated by lever 90 in position 90' so that switch 46 is closed and switch 44 is open.

When lever 88 is in position 88", switches 40 and 42 are open. When lever 90 is in position 90', switches 44 and 46 are open.

From the foregoing, it will be understood that the mounting plates 100 and 102 are positioned on the transmission so that the switches 40, 42, 44 and 46 are in positions to be actuated by the shifting levers and so that only one switch is closed during operation in one gear ratio. Thus, each switch acts to detect one gear ratio position, as discussed above.

From the foregoing, it can be seen that the system of the present invention provides the capability of selecting from first, second, third and fourth gear operation of the nitrous oxide system. The system also automatically turns the nitrous oxide solenoids off while shifting from one gear to another and provides the capability to turn the entire nitrous oxide system off by releasing the switch 14 on the shift lever 12.

Track conditions vary from track to track. At one track, it may be possible to use nitrous oxide during operation in all four gears without any tire problems. In another track, the nitrous oxide system may provide too much horsepower during operation in some gear ratios, and, accordingly, the nitrous system may be turned off automatically when the transmission is in these gear ratios by simply opening the gear ratio selection switches associated with the overpowered gears before starting the race.

Figure 3:
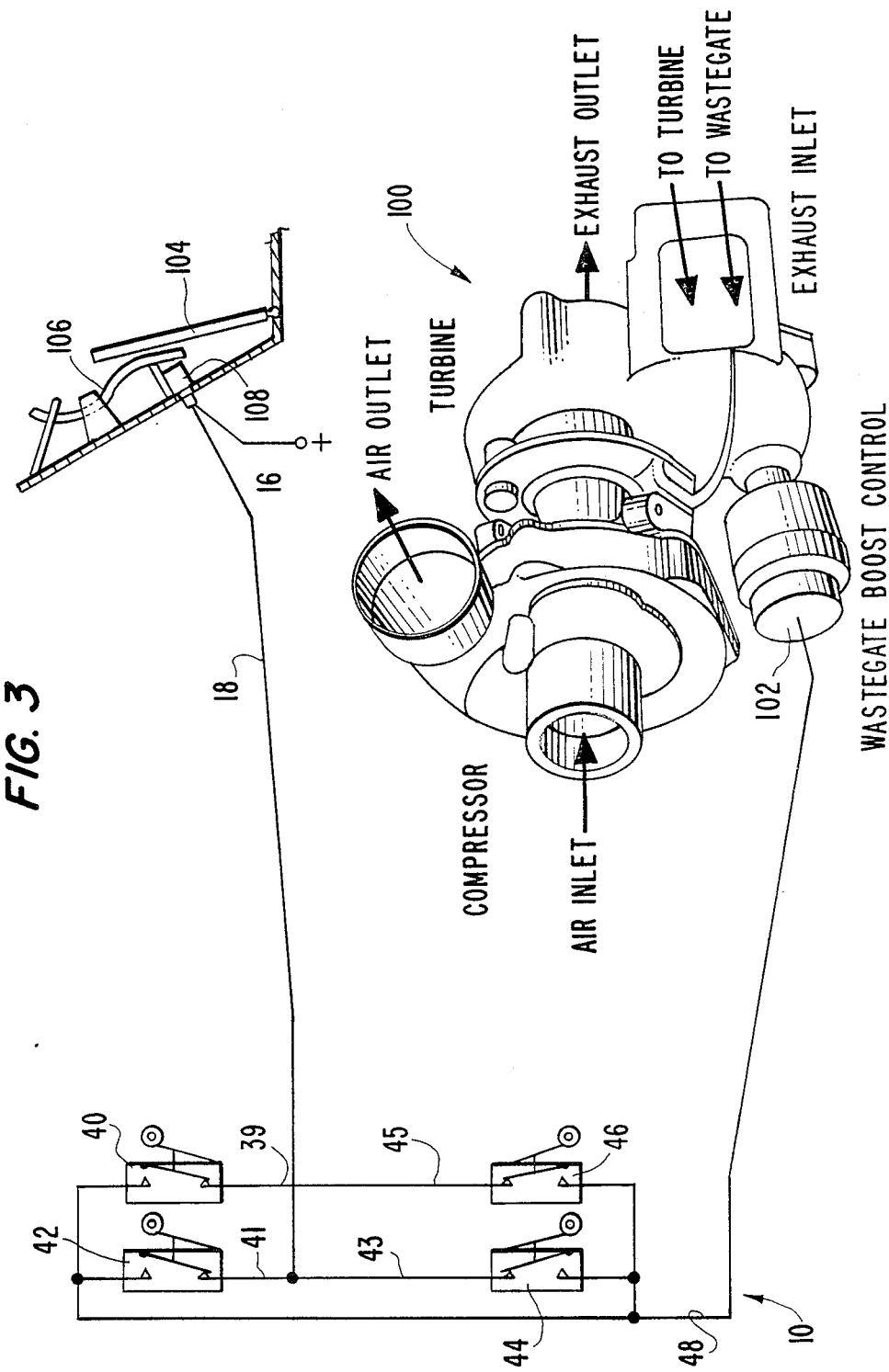
FIG. 3 is a schematic view showing the control system of the present invention used with a turbocharger.

FIG. 3 shows the control system 10 of the present invention used with a turbocharger 100. The turbocharger 100 is of conventional construction and includes a wastegate boost control 102 which includes a solenoid for controlling the position of the wastegate of the turbocharger. As is well known, the wastegate controls the amount of exhaust gas which is passed through the turbine of the turbocharger and thus controls the boost of the turbocharger. When the wastegate is closed, maximum flow through the turbine is produced and maximum boost is produced. When the wastegate is open, the minimum flow through the turbine is produced, and the minimum boost is produced. The entire turbocharger 100 is conventional and a detailed discussion of its construction and operation will therefore not be set forth here.

The control 10 of FIG. 2 includes the switches 40, 42, 44 and 46 which are fed directly from line 18. Line 18 provides current from a switch 108 which is actuated by an accelerator pedal 104. When pedal 104 is depressed, the accelerator linkage 106 is engaged and switch 108 is actuated and current is permitted to flow from the positive voltage source through line 16, switch 108 and line 18 to the switches 40, 42, 44 and 46.

Line 48 extends from the switches 40, 42, 44 and 46 to the wastegate boost control solenoid 102 and causes the wastegate to close thereby enabling the turbocharger to provide maximum boost.

In operation, it can be seen that the control system 10 does not operate when the accelerator 104 is not depressed. However, when the accelerator is depressed, the switch 108 is actuated and the control system is energized. At this time, as long as the transmission is in gear, one of the switches 40, 42, 44 and 46 is closed thereby passing current to the wastegate boost control solenoid causing it to close the wastegate and enable the turbocharger to produce maximum boost. On the other hand, when the transmission is being shifted between gears, none of the switches 40, 42, 44 and 46 is closed so that the wastegate solenoid is not energized. In this condition, the wastegate is open and the boost is a minimum. Thus, it can be seen that the turbocharger will produce maximum boost while the transmission is in a gear but will produce only minimum boost while the transmission is not in gear, such as when it is being shifted between gears. This ensures that the engine will not overwind if the transmission is shifted without the accelerator pedal being released or if the accelerator pedal is depressed with the transmission in neutral.

Figure 4:
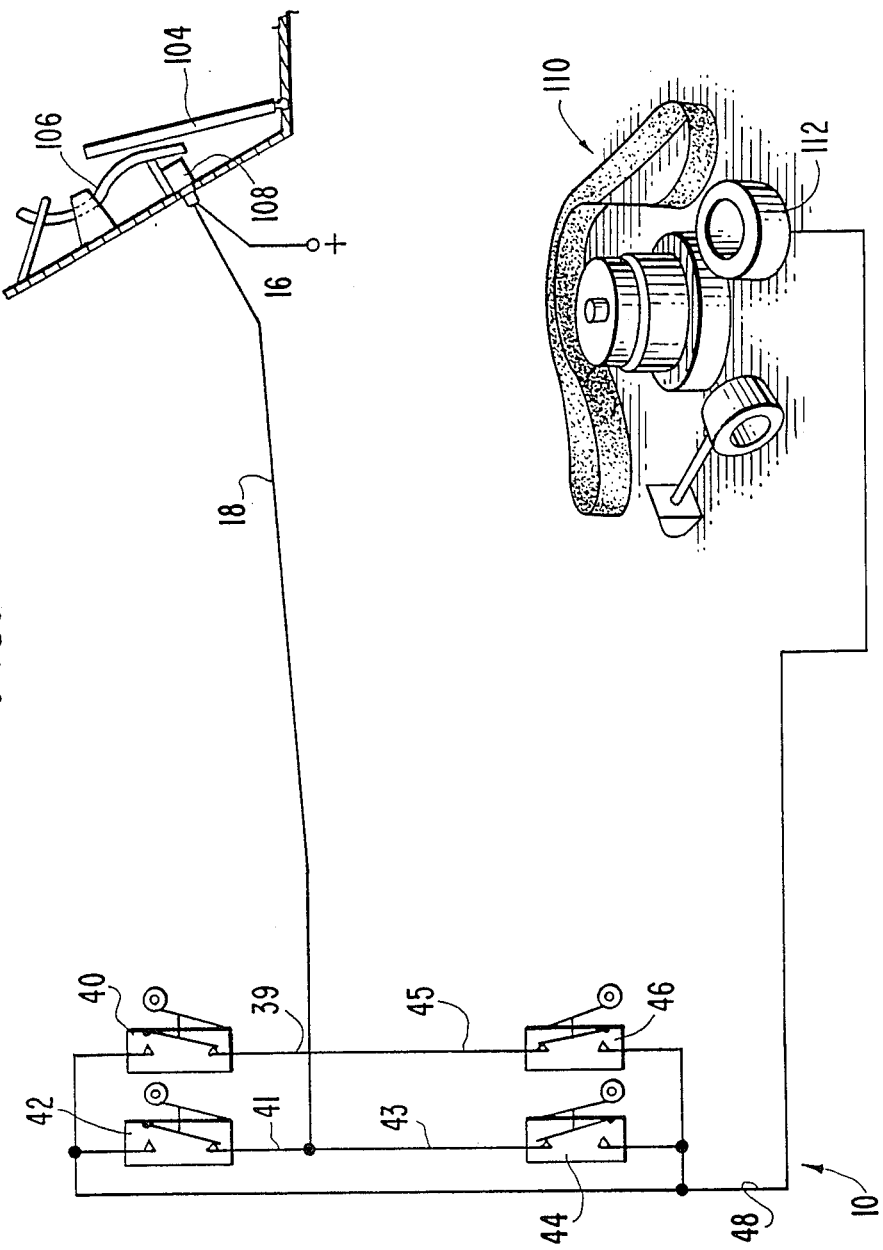
FIG. 4 is a schematic view showing the control system of the present invention used with a supercharger.

FIG. 4 shows the control system 10 of the present invention as it can be used in a supercharger system 110. The structure and function of supercharger systems are well known and will not be discussed in detail here. It is noted, however, that the line 18 of the control system 10 is connected to the solenoid operated clutch 112 of the supercharger blower. This clutch controls operation of the supercharger and causes the supercharger to be engaged when energized and to be disengaged when deenergized.

Also as shown in FIG. 4, the line 18 of the control system 10 is connected to a switch 108' which is actuated by the accelerator pedal 104. Unlike switch 108, however, switch 108' is actuated only when the pedal 104 is fully depressed. In this embodiment of the invention, the control system 10 is not energized until the accelerator pedal 104 is fully depressed. In this state, the clutch 112 is engaged as long as the transmission is in gear and is disengaged when the transmission is not in a gear, as when the transmission is shifting between gears. Accordingly, whenever the transmission is not in a gear and the accelerator pedal is fully depressed, the supercharger clutch is disengaged and the supercharger is inoperative. This prevents the engine from overwinding due to the depression of the accelerator pedal when the supercharger is operating and there is no load on the engine.

It will be noted that the connection of the turbocharger in FIG. 3 could be made to be the same as the connection of the supercharger in FIG. 4 and vice versa. In each case, an important feature is the fact that the actuation of the turbocharger or the supercharger is based on the position of the accelerator pedal and the position of the transmission.

Figure 5:
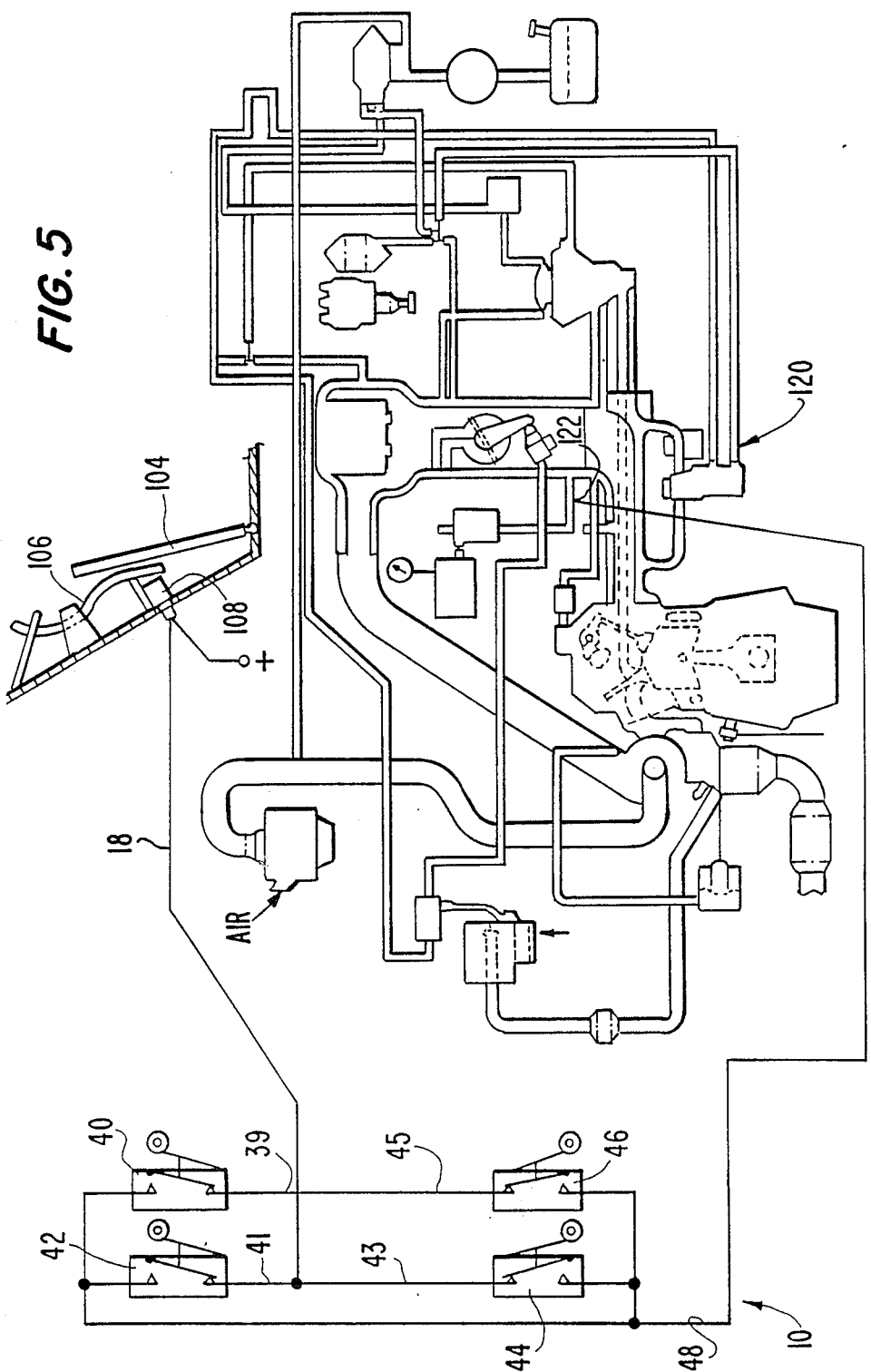
FIG. 5 is a schematic view showing the control system of the present invention used with fuel injection system.

FIG. 5 shows the control system 10 of the present invention used with a fuel injection system 120. The details of fuel injection systems are well known and will not be discussed here. However, it is noted that the line 48 from the control system 10 is connected to the main pressure exchanger solenoid 122 which controls the amount of fuel delivered to the engine.

As with the embodiment of FIG. 4 the line 18 of control system 10 is connected to the switch 108' which is actuated only when the accelerator pedal 104 is fully depressed. When the accelerator pedal is only partially depressed or not depressed at all, the control system 10 is not energized. If the accelerator pedal is fully depressed and the transmission is in gear, the fuel injection system 120 is fully operational and responds to the command from the accelerator pedal. However, if the accelerator pedal is fully depressed and the transmission is not in gear, the pressure exchange solenoid is not energized and the fuel injection system is set to provide only a minimal amount of fuel to the engine. This operation ensures that the engine is not overwound with no load.

Figure 6:
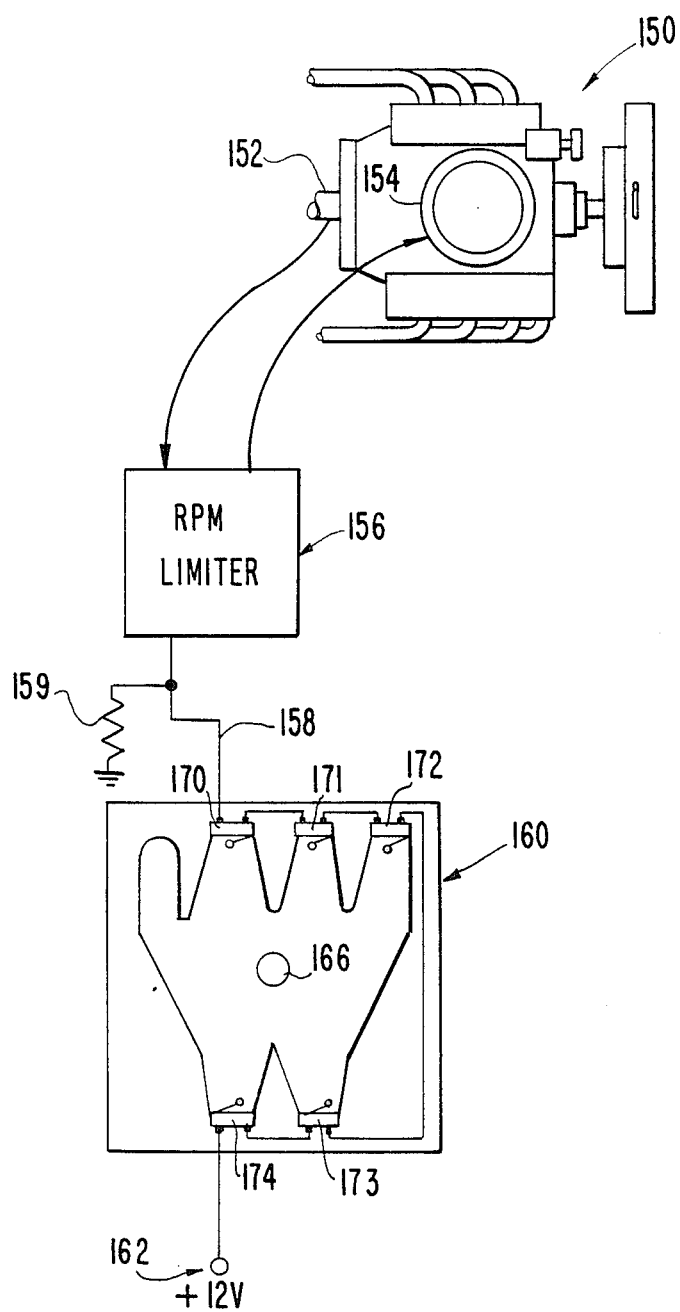
FIG. 6 is a schematic view showing another embodiment of the present used with an rpm limiter.

FIG. 6 shows another embodiment of the invention for use with an rpm limiter to control the engine rpm depending on the state of the transmission. In FIG. 6, an internal combustion engine 150 is shown having an output shaft 152 and an ignition system 154. A conventional rpm limiting system 156 is connected to the engine. RPM limiter 156 measures the rpm of output shaft 152 and controls the ignition system 154 so that the engine rpm does not exceed a certain value. This type of rpm limiting system is conventional and will not be discussed in detail here. Such systems can be purchased, for example, from Autotronic Controls Corp., 1490 Henry Brenan Drive, El Paso, Tex. as part number MSD 6T for the basic limiter and part number PN 8739 for a two step module which permits the rpm limit to be changed between a low limit and a high limit. This conventional system can be set to change the rpm limit between a low rpm value, such as 1500, and a high rpm value, such as 6000, by adjusting the voltage on line 158. If the voltage on line 56 is high, about 12 volts, the rpm limit is low, and if the voltage on line 158 is low, the rpm limit is high.

According to the present invention, a shift lever sensing system 160 is placed between a 12 volt supply 162 and the line 158 to the limiter 156. The shift lever sensing system 160 includes a plate 164 which surrounds the shifting lever 166. Plate 164 mounts a plurality of switches 170-174 associated, respectively, with the transmissions gears 1-5. In first gear, switch 170 is actuated, in second gear, switch 171 is actuated, etc. Switches 170-174 are connected in series with each other and in series with the 12 volt supply 162. The switches 170-174 are all normally closed so that, when none of the switches is actuated, the 12 volt supply 162 is connected to line 158 and the limiter 156 is set to produce a low rpm limit. If any of the switches 170-174 is actuated, the 12 volt supply to line 158 is interrupted, the line is brought to ground potential by a pull down resistor, and the rpm limiter 156 is set to produce a high rpm limit.

In operation, the rpm limiter 156 with the lever sensing system 160 ensures that the engine will not over rev if a gear is missed when shifting. This is because, when the gear shift lever 166 is not in a gear engaging position, all of the switches 170-174 are deactuated and a high voltage is sensed by the rpm limiter so that a low rpm limit is set. The engine cannot rev over this low limit which may be, for example, 1500 rpm. On the other hand, when a gear shift is successfully completed, one of the switches 170-174 will be actuated and the rpm limiter 156 will no longer see the high voltage on line 158 so that a high rpm limit will be established. This ensures that the engine will be able to rev to its maximum limit for full power.

It should be understood that the switches 170-174 can be positioned on the transmission itself to sense the position of the transmission gear shift levers, as shown in FIG. 2 with regard to the first embodiment of the invention. Conversely, the shift lever sensing system 160 of FIG. 6 could be used in the first embodiment of the invention in place of the plates and switches shown in FIG. 2.

Also, it will be understood that the series connection shown in FIG. 6 could be replaced with a parallel connection of switches as used in the first embodiment of the invention with reference to FIG. 1. In this case, normally open switches would be used and the output signal would be inverted before it is input to the limiter 156. These and other modification would be readily apparent to one of ordinary skill in the art.

The foregoing description is set forth to illustrate the present invention but is not intended to limit the scope thereof. Clearly, numerous additions, changes and other modifications can be made to the invention without departing from the scope thereof as set forth in the appended claims.

What is claimed is:

1. A system, comprising:
   a nitrous oxide supply system comprising:
      a source of nitrous oxide;
      a supply conduit for delivering said nitrous oxide to an intake manifold of an engine; and
      a valve in said supply conduit; and
   a control for said nitrous oxide supply system, comprising:
      means for sensing a gear ratio position of a transmission connected to said engine; and
   means for opening and closing said valve in dependence on the sensed gear ratio position,
   wherein said sensing means comprises switches for sensing positions of shift levers on said transmission and
   wherein said system comprises a plurality of manually actuable switches connected to said switches for sensing positions of said shift levers, said manually actuable switches being associated, respectively, with the gear ratios of said transmission and being individually actuable to cause actuation of said valve during operation in the associated gear ratio.

2. A system as set forth in claim 1 where said system further includes a master switch connected to said manually actuable switches to provide power thereto such that, as long as said master switch is actuated, said valve is actuated during operation in said gear ratios associated with said actuated manually actuable switches.

3. A system comprising:
   a vehicle having an engine with an intake manifold, and a transmission connected to said engine;
   a nitrous oxide supply system comprising:
      a source of nitrous oxide;
      a supply conduit for delivering said nitrous oxide to said intake manifold of said engine; and a valve in said supply conduit; and
a control for said nitrous oxide supply system, comprising:
   means for sensing a gear ratio position of said transmission; and
   means for opening and closing said valve in dependence on the sensed gear ratio position,
   wherein said sensing means comprises switches for sensing positions of shift levers on said transmission, and
   wherein said system comprises a plurality of manually actuable switches connected to said switches for sensing positions of said shift levers, said manually actuable switches being associated, respectively, with the gear ratios of said transmission and being individually actuable to cause actuation of said valve during operation in the associated gear ratio.

4. A system as set forth in claim 3 where said system further includes a master switch connected to said manually actuable switches to provide power thereto such that, as long as said master switch is actuated, said valve is actuated during operation in said gear ratios associated with said actuated manually actuable switches.

5. A system as set forth in claim 3 wherein said transmission is a manual transmission.

* * * * *